Figure 1:
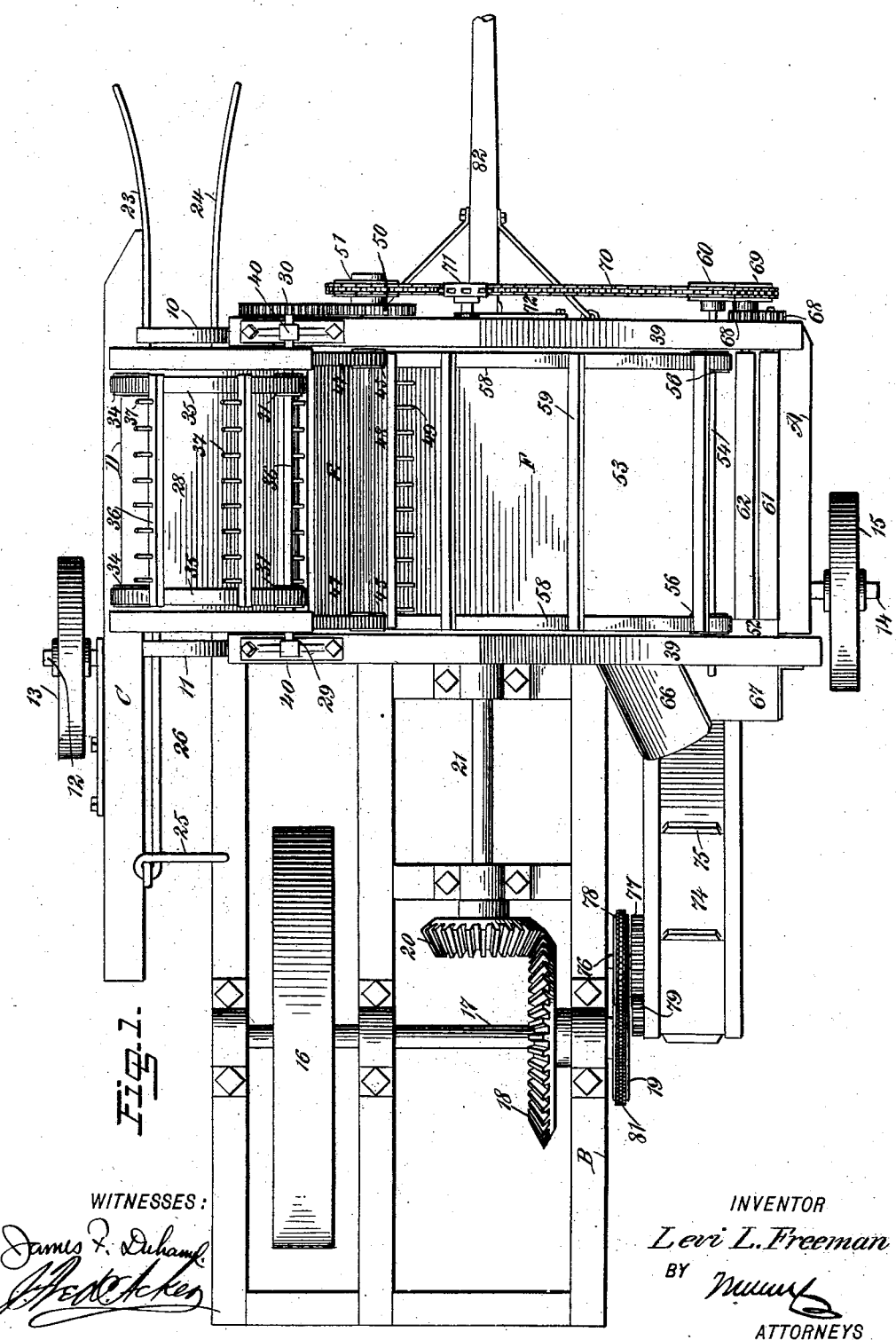

No. 716,023. Patented Dec. 16, 1902.
L. L. FREEMAN.
CORN HARVESTER AND SHOCKER.
(Application filed May 10, 1902.)

(No Model.) 3 Sheets—Sheet 1.

WITNESSES:

INVENTOR
Levi L. Freeman
BY
ATTORNEYS

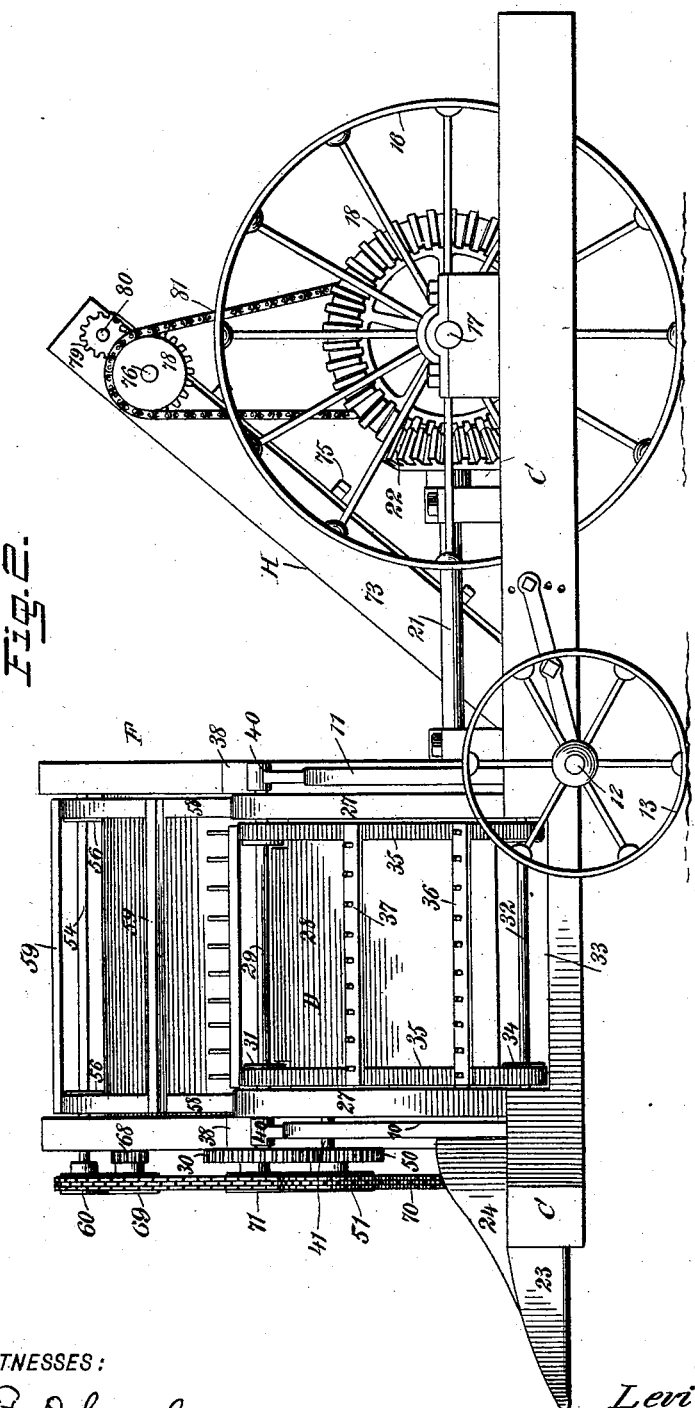

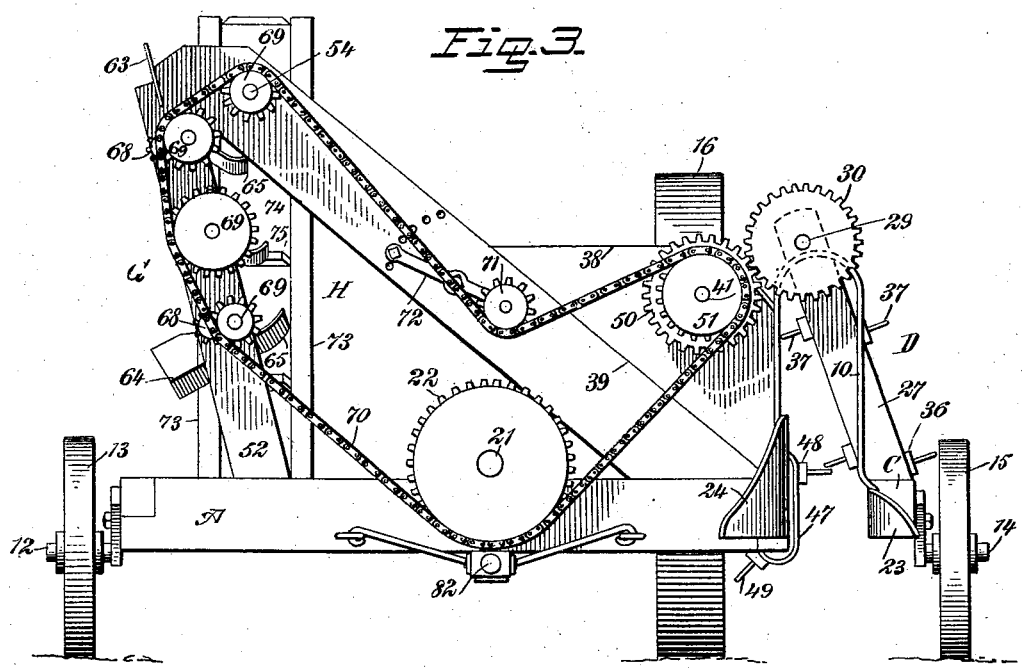
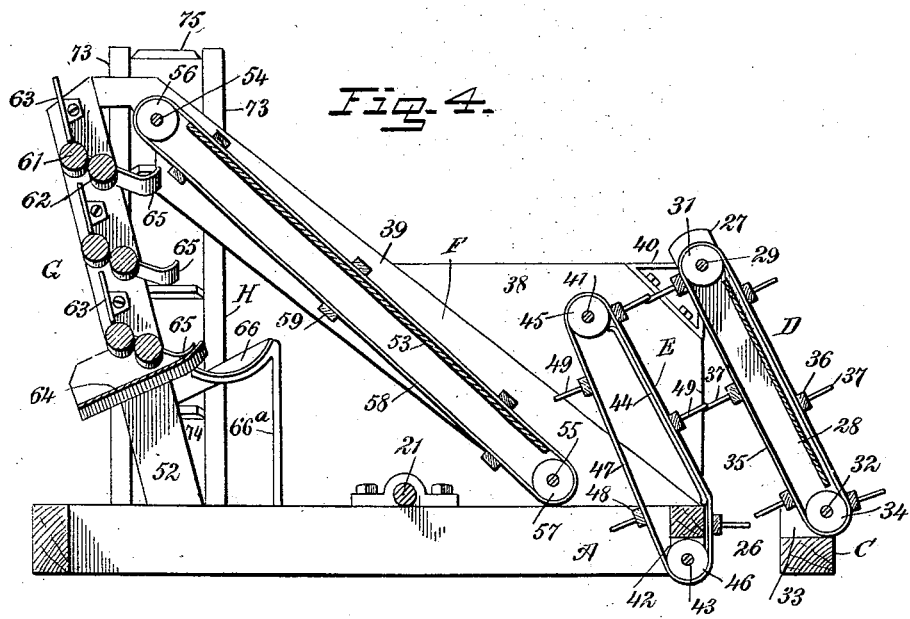

UNITED STATES PATENT OFFICE.

LEVI L. FREEMAN, OF KANARANZI, MINNESOTA.

CORN HARVESTER AND SHOCKER.

SPECIFICATION forming part of Letters Patent No. 716,023, dated December 16, 1902.

Application filed May 10, 1902. Serial No. 106,716. (No model.)

*To all whom it may concern:*

Be it known that I, LEVI L. FREEMAN, a citizen of the United States, and a resident of Kanaranzi, in the county of Rock and State of Minnesota, have invented a new and Improved Corn Harvester and Shocker, of which the following is a full, clear, and exact description.

The purpose of my invention is to provide a simple, durable, and economic construction of harvesting implement whereby to remove the ears of corn from the standing stalks and automatically convey the ears of corn to automatically-operating husking devices and to convey the husked corn to an elevator which discharges the said ears of corn into a wagon or other vehicle traveling with the implement, all of the parts above-referred to, with the exception of the wagon, being mounted upon a common wheel-supported frame.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a plan view of the improved implement. Fig. 2 is a side elevation of the same. Fig. 3 is a front elevation of the implement; and Fig. 4 is a vertical section through devices for removing the ears of corn from the stalks, devices for removing the husks from the ears, and the conveyer between the two devices.

The frame consists of a forward section A and a rear section B, both sections being preferably in the same horizontal plane. Also, preferably, the right-hand portion of the frame-section A extends beyond the corresponding portion of the rear frame-section B, as is shown in Fig. 1; but at the left-hand side of the implement the two frame-sections are in horizontal alinement. At the left-hand side of the frame a parallel beam C is located, spaced from the frame and extending beyond the front section of the frame and as far as desired toward the back end of the frame, as is shown in Fig. 1. The beam C is connected with the forward frame-section A at its front and rear by arches 10 and 11, preferably of metal, and at the outer side of the beam C an adjustable axle 12 is carried, upon which a small supporting-wheel 13 is mounted to turn, and at the right-hand side of the forward frame-section A a second axle 14 is provided, upon which a small supporting-wheel 15 is mounted to turn. This second axle may be adjustable also, if desired.

The main supporting-wheel 16 is near the left-hand side of the rear frame-section B and is secured upon an axle 17, journaled in suitable bearings, which axle 17 serves as the main driving-shaft for the machine. A bevel-gear 18 is secured upon the driving axle or shaft 17, between its ends, and at the right-hand end of the axle 17 a sprocket-wheel 19 is attached. The gear 18 meshes with a pinion 20, fast upon the rear end of a longitudinal shaft 21, journaled in suitable bearings in each frame-section, and at the front end of the shaft 21, which is at the front of the implement, a driving-gear 22 is secured, as is shown in Fig. 3.

Forwardly-extending and outwardly-diverging fenders 23 and 24 are secured to the forward left-hand side of the forward frame-section A and the inner front surface of the beam C, which fenders are adapted to guide the standing corn into the space 26 between the beam C and the frame of the machine, the arches 10 and 11 being sufficiently high to admit tall stalks, and preferably at the rear end portion of the said stalk-receiving space 26 a cross-bar 25 is located, which will bend the stalks to the ground after the ears have been removed by a mechanism to be hereinafter described. The cross-bar 25 also forms a brace for the beam C and is shown as a part of the outer fender carried along the inner face of the beam; but the said cross-bar 25 may be omitted, if desired.

When the standing stalks of corn have entered the space or channel 26 between the frame and outlying beam C, the stalks are brought in a standing position between stripping devices D and E, the device D being carried by the said beam C and the device E by the left-hand side bar of the forward frame-section A, extending practically from the front to the rear of the said section, and both of the stripping devices D and E extend upward from their supports and have each practically the same inclination in direction of the right-hand side of the implement, as is best shown in Fig. 4.

The frame of the outer stripping device D consists of side pieces 27 and a back board or plate 28, secured to the side pieces, but stopping short of their ends. A shaft 29 is passed through the upper end portions of the side pieces 27, extending beyond their side surfaces, and the said shaft carries a gear-wheel 30 at its forward end and pulleys 31 between its ends, adjacent to the inner surfaces of the side pieces 27. A second and parallel shaft 32 is mounted to turn at the lower end portion of the side pieces 27, preferably in the side walls of a recess 33, made in the beam C, as is illustrated in Figs. 2 and 4, and this lower shaft 32 carries pulleys 34, in longitudinal alinement with the pulleys 31 on the upper shaft 29. Endless belts 35 are passed over the pulleys 31 and 34, and these belts are connected by slats 36, secured to their outer faces, and on each slat 36 a series of pins 37 is arranged.

With reference to the stripping device E its side pieces 38 are shown supported on the side pieces 39 of an elevator F, adapted to receive the ears of corn from the stripping devices D and E, and the elevator side pieces 39 extend from the left-hand side of the forward frame-section A upward and in direction of the right-hand side of the said frame-section, as is shown in Fig. 4.

At the upper corners of the side pieces 38 bearings 40 are secured for the ends of the upper shaft 29 of the stripping device D, and at a point near the upper edges of the side pieces 38 the shaft 41 is mounted to turn. In a recess 42, made in the under portion of the left-hand side beam of the forward frame-section A, a second and parallel shaft 43 is mounted, as is shown in Fig. 4. The upper shaft 41 is to the right of the lower shaft 43, and a back board 44, having an upward inclination from left to right, is secured to the side pieces 38, extending from a point below the upper shaft 41 to the upper left-hand edge of the forward frame-section A, as is also shown in Fig. 4. Pulleys 45 are secured upon the upper shaft 41, between the side pieces 38, and similar pulleys 46 are secured upon the lower shaft 43. Corresponding pulleys 45 and 46 support endless belts 47, connected by slats 48, secured to the outer faces of the belts, and each slat is provided with a series of pins 49. Thus when the standing stalks are between the devices D and E and the endless stripping aprons formed by the said belts and toothed connecting-slats are in motion the ears of corn will be stripped and pulled from the stalks by the teeth of said apron, and the severed ears will be carried upward and delivered to the elevator F, above referred to.

It will be observed that a straight portion of the stripping-apron of the stripping device E is within the space 26 intervening the frame of the implement and the beam C, as is shown in Fig. 4. and thus the lower rows of teeth of the stripping-apron of the stripping device E will be sure to take hold of any ears of corn that may grow low on the stalks. At the forward end of the shaft 41 two gears are secured, as is shown in Fig. 3, preferably a large gear 50, which meshes with the gear 30 on the shaft 29 of the stripping device D, and a smaller gear 51, to be driven in a manner to be hereinafter particularly described.

The elevator F, in addition to the side pieces 39, heretofore mentioned, consists of a back board 53, secured to the side pieces, and above the upper end of the back board 53 a shaft 54 is journaled in the side pieces 39. At the lower portion of the said side pieces a second and parallel shaft 55 is mounted to turn. Pulleys 56 are secured upon the upper shaft 54, and corresponding pulleys 57 are secured upon the lower shaft 55, as is shown in Fig. 4. Endless belts 58 are passed over corresponding pulleys 56 and 57, and these belts are connected by slats 59, which are secured to the outer faces of the belts, forming thereby an elevator-apron adapted to carry the ears of corn delivered thereto upward and deliver such ears to the husking mechanism G, which is at the upper end of the elevator. In fact, the upper ends of the side pieces 39 of the elevator F are attached to the side pieces 52 of the husking mechanism G, which side pieces are supported upon the front and rear cross-bars of the forward frame-section A and extend upward therefrom with an inclination from left to right. At the forward end of the upper shaft 54 of the elevator F a gear 60 is firmly secured, as is illustrated in Fig. 3.

The husking device G, in addition to the side pieces 52, consists of series of rollers, two rollers preferably constituting a series, and the series of rollers 61 and 62 are arranged one below the other, as is shown in Fig. 4; but the rollers 61 of each series are at the outer portion of the frame of the device and are higher than the rollers 62 of the series, which latter rollers are at the inner portion of the frame. The said rollers incline from the front downward and rearward. Thus it will be observed that the rollers of a series have inclination in two directions—an inclination downward from the front to the rear, as stated, and an inclination downward from the right to the left hand side of the implement. These rollers are adapted to revolve in direction of each other, and the ears of corn that escape the first series of rollers will be received by the next lower series or any one series below, according to the direction in which the ears may fall, and as the rollers of a series turn in direction of each other the husks of the ears will be grasped by these rollers and stripped therefrom, and said husks will pass out from the implement at the right-hand side of the same.

Partitions 63 are located between the series of rollers, separating them, and these partitions are preferably located between the higher or outer rollers 61 of a series, and a partition 63 is also located above the uppermost series of rollers, as is also shown in Fig. 4. At the bottom portion of the series of husking-rollers a chute 64 is located, extending beyond the right-hand side of the said rollers and beyond the left-hand side, and said chute 64 is given a downward inclination in direction of the right-hand side of the implement and is intended to receive any husks that may escape passing between the series of husking-rollers and be delivered at the right-hand side of the implement.

At the rear end of each series of rollers 61 and 62 a downwardly and rearwardly inclined short shield 65 is provided in order to direct the husked ears of corn to an elevator H, which is at the rear of the husking device, and to insure all of the husked ears of corn being delivered to the said elevator H a chute 66 is supported immediately below the chute 64 of the husking device, as is shown in Figs. 1 and 4, said chute 66 being supported by suitable legs 66ª, and this chute has a downward and rearward inclination to the elevator, as is particularly shown in Fig. 1, and in order to prevent the husked ears of corn from dropping out at the right-hand rear portion of the husking device when the ears are passing to the elevator an upright shield 67 is located at such portion of the husking device, as is shown in Fig. 1.

At the front portion of the frame of the husking device each roller 61 and 62 is provided with and attached to a small gear 68, as is shown in Figs. 2 and 3, and the gears of the rollers of a series mesh. Preferably the forward journals of the left-hand rollers of the series of husking-rollers are provided with larger gears 69, as shown in Figs. 2 and 3, and a chain belt 70 is passed in engagement with the gears 69, the gears 60, connected with the upper shaft 54 of the elevator F and in engagement with the front driving-gear 22, and the gear 51 on the upper shaft of the inner or right-hand stripping device E, as is particularly shown in Fig. 3. A tension-roller 71 is provided for the belt 70, which tension-roller is carried by an adjustable pivoted arm 72.

The rear elevator H is adapted to convey the husked ears to a vehicle following the implement at the rear of said elevator H, and although the said elevator H may be of any approved construction it preferably consists of side pieces 73, secured to the rear offset portion of the front frame-section A, the side pieces being given an upward and rearward inclination, and an apron 74, which passes over suitable rollers at the top and the bottom of the said side pieces, the apron being provided with battens 75 on its outer face. Motion is imparted to the apron 74 of the rear elevator H by mounting a short shaft 76 to turn in the elevator-frame, near its top, and said shaft 76, as is shown particularly in Fig. 1, is provided with a gear 77 and a sprocket-wheel 78, the gear 77 being made to mesh with the gear 79 on the end of the shaft 80, carrying the upper supporting pulleys or drum for the apron 74, and a chain belt 81 engages with the sprocket-wheel 78 and with the sprocket-wheel 19 at the right-hand end of the driving axle or shaft 17, as is also shown in Fig. 1. Preferably a tongue 82 is attached to the forward central portion of the frame of the machine.

It will be understood that any suitable form of binder may be applied to the machine, preferably at the right-hand side of the frame.

Having thus described my invention, I claim as new and desire to secure by Letters Patent—

1. In a corn-harvester, a wheel-supported frame having a channel open at the front to receive standing stalks, fingers at the forward end of the said channel, and a stripping mechanism adapted for the removal of the ears of corn from standing stalks, which stripping mechanism consists of endless aprons located at opposite sides of the said channel, one of said aprons inclining over the channel and the other apron inclining from the channel, both of said aprons inclining in the same direction, and teeth attached to the outer faces of the said aprons, substantially as described.

2. In a corn-harvester, a frame having a longitudinal channel at one side, open at its forward end and adapted to receive standing corn, fingers extending from opposite sides of the forward end of the said channel, and a stripping device consisting of frames extending upward from opposite sides of the said channel, the said frames being inclined in the same direction and toward the opposite side of the frame of the machine, endless stripping-aprons mounted to revolve in the said frames, substantially parallel with each other and inclined to correspond with the said frames, and teeth secured to the outer surface of the said aprons, the teeth on one apron being adapted to pass between the teeth on the opposing stretch of the opposing apron, for the purpose described.

3. In a corn-harvester, a frame having a longitudinal channel at one side, open at its forward end and adapted to receive standing corn, fingers extending from opposite sides of the forward end of said channel, and a stripping device consisting of frames extending upward from opposite sides of the said channel, the said frames being inclined in the same direction and toward the opposite side of the main frame of the machine, endless stripping-aprons mounted to revolve in the said frames, substantially parallel with each other and inclined to correspond with the said frames, the opposing stretches of the aprons moving in an upward direction, and teeth secured to the outer surface of the said aprons, the teeth on one apron being adapted to pass between the teeth on the opposing stretch of the opposing apron, an elevator at the rear of the rear stretch of the aprons, and a husking device adjacent to the opposite end of the elevator, as and for the purpose described.

4. In a corn-harvester, the combination with a wheel-supported frame having a longitudinal channel at one side open at the front, fingers secured to the forward portion of the said channel, a driving-wheel for the frame, and gearing driven from the axle on which the driving-wheel is mounted, of stripping devices, each device consisting of a frame located at opposite sides of the said channel in the main frame, roller-supports carried by the said frames, endless aprons carried by the said roller-supports, said aprons being in parallelism for the greater part of their length and inclined in the same direction and toward the side of the frame opposite which they are located, the opposing stretches of the aprons traveling in an upward direction, teeth secured to the outer surfaces of the said aprons, the teeth on the opposing stretches of the aprons being adapted to pass each other, an elevator having an inclination in the same direction as the stripping-aprons, a husking device located adjacent to the elevator and adapted to receive the ears of corn therefrom, a second elevator adapted to receive the husked ears of corn, and a driving connection between the said gearing driven from the drive-wheel of the frame, and the movable parts of the husking mechanism and the stripping-aprons and elevators, as and for the purpose described.

5. The combination with a wheel-supported frame provided with a channel at one side, open at its forward end, fingers extending from the forward end of the said channel, stripping-aprons mounted to revolve one at each side of said channel, said aprons being in parallelism for a portion of their length and having an inclination in direction of the opposite side of the machine, pins extending from the outer faces of the stripping-aprons, and an elevator located at the delivery end of the stripping-aprons, having a corresponding inclination, of a husking device consisting of a frame inclined in the same direction as the stripping-aprons and elevator, husking-rollers mounted in series of twos in the said frame, said husking-rollers having a downward and rearward inclination and a side inclination in direction of the stripping-aprons, partitions located between the series of husking-rollers, chutes located at the lower end portions of the said husking-rollers, and a chute located below the lower series of husking-rollers, having a downward inclination in direction of one side of the machine, an offtake-elevator for the husked ears of corn, carried by the frame and adapted to receive material from the said chutes and said husking-rollers, and means, substantially as described, for driving the husking-rollers, the conveyers of the elevators and the stripping-aprons by the movement of the machine when traveling over the ground, as described.

6. In a corn-harvester, a wheel-supported frame having a channel open at the front to receive standing stalks, guides for the stalks at the forward end of the said channel, a stripping mechanism consisting of endless aprons extending upward from opposite sides of the said channel and provided with teeth on their outer faces, one of said aprons inclining over the said channel and the other inclining from the channel, the said aprons both inclining in the same direction, an elevator for receiving the corn from the stripping mechanism, and a husking device located adjacent to the elevator, substantially as set forth.

7. In a corn-harvester a wheel-supported frame having a channel open at the front to receive standing stalks, guides for the stalks at the forward end of the said channel, a stripping mechanism consisting of endless aprons provided with teeth and extending upward from opposite sides of the said channel, the apron at one side of the channel inclining over the same, and the other apron having a lower vertical portion at the side of the channel and a main portion inclining from the channel, in the same direction as the first-mentioned apron, as set forth.

In testimony whereof I have signed my name to this specification in the presence of two subscribing witnesses.

LEVI L. FREEMAN.

Witnesses:
HENRY UNTIEDT,
JAMES CHRISTIAN.